US005443179A

United States Patent [19]

Palmer et al.

[11] Patent Number: 5,443,179

[45] Date of Patent: Aug. 22, 1995

[54] GUMBALL BANKS

[75] Inventors: Leonard H. Palmer, Addison; Richard A. Freeland, Big Rock, both of Ill.

[73] Assignee: Processed Plastic Company, Montgomery, Ill.

[21] Appl. No.: 201,383

[22] Filed: Feb. 24, 1994

[51] Int. Cl.[6] .............................................. B65G 59/00

[52] U.S. Cl. .................................... 221/265; 194/297

[58] Field of Search ............... 221/265, 263, 277, 271; 194/297

[56] References Cited

U.S. PATENT DOCUMENTS

| | | | |
|---|---|---|---|
| 1,083,515 | 1/1914 | Amsler | 194/85 |
| 1,252,121 | 1/1918 | Jacobs | 221/265 |
| 1,316,492 | 9/1919 | Mason | 221/265 |
| 1,321,385 | 11/1919 | Millard | 221/265 |
| 1,381,135 | 6/1921 | Randall | 194/297 |
| 1,441,438 | 1/1923 | Leonhardt | 194/297 |
| 1,475,730 | 11/1923 | Walter | 194/297 |
| 1,540,389 | 6/1925 | Felton | 221/265 |
| 1,651,605 | 12/1927 | Kuhn et al. | 221/265 |
| 1,981,931 | 11/1934 | Vogel et al. | 194/85 |
| 1,998,194 | 4/1935 | Hladky et al. | 194/85 |
| 2,653,069 | 9/1953 | Mason | 312/89 |
| 2,694,480 | 11/1954 | Mason | 194/85 |
| 2,759,632 | 8/1956 | Ussery et al. | 221/199 |
| 3,162,287 | 12/1964 | Lupovici | 194/85 |
| 3,810,535 | 5/1974 | Phipps | 194/85 |
| 4,420,095 | 12/1983 | Galoob | 221/265 |
| 4,903,861 | 2/1990 | Yuyama | 221/265 |

*Primary Examiner*—Kenneth Noland

*Attorney, Agent, or Firm*—Leydig, Voit & Mayer, Ltd.

[57] ABSTRACT

Novel gumball banks are provided for which dispense gumballs upon insertion of a coin and store inserted coins. The gumball bank comprises a reservoir for gumballs, a base, and a dispensing mechanism. The base defines an upper floor. The upper floor supports the reservoir and has a gumball opening communicating with the reservoir and a coin slot. The base further defines a lower floor. The lower floor has a chute adapted to receive gumballs and a coin slot. The base also defines a coin storage area in communication with the coin slot in the lower floor. The dispensing mechanism is disposed between the upper and lower floors and is adapted to dispense gumballs from the reservoir to the chute and to deposit coins in the coin storage area. The dispensing mechanism includes an actuator arm having a socket for receiving a coin and a coin slot aligned with the socket. The transfer arm has a gumball opening and a coin slot. The actuator arm and transfer arm are mounted for movement in first and second directions between respective first and second positions.

19 Claims, 5 Drawing Sheets

GUMBALL BANKS

FIELD OF THE INVENTION

This invention relates to gumball banks and, more particularly,to gumball banks having improved dispensing mechanisms.

BACKGROUND OF THE INVENTION

Toy gumball banks are well known and many different designs have been proposed or commercialized. In contrast to coin-operated gumball vending machines, in designing toy gumball banks there is a premium on simplicity of design and ease of manufacture. Thus, since they are designed to withstand rough service and tampering, coin-operated gumball vending machines generally are too complicated to be adapted for use as toy banks.

Toy gumball banks preferably are fabricated from injection molded plastic parts. One popular and commercially successful design is shown in U.S. Pat. No. 3,810,535 to C. Phipps. This design includes a dispensing mechanism which is rotatably mounted in a base between upper and lower floors. The dispensing mechanism includes a circular, rotating transfer arm having a plurality of openings adapted to transport gumballs from a reservoir. The transfer arm is rotated through a number of predetermined positions, in each of which a gumball opening is situated above a dispensing chute so that gumballs may roll down into the chute.

More particularly, a user can insert a coin into a coin socket located on an actuator arm. The actuator arm has a coin slot aligned therewith. The transfer arm also has a number of coin slots, one of which will be similarly aligned with the coin socket in each of the transfer arm's predetermined positions. Thus, an inserted coin will roll into the actuator arm coin slot and one of the transfer arm coin slots. In that position, the coin serves to couple the actuator arm and the transfer arm together for simultaneous rotation.

When the arms are so coupled, rotation of the actuator arm in a first direction will cause the transfer arm to rotate in the same direction to its next predetermined position. At this point, the coin drops through a coin slot in the lower floor of the base and into a coin storage area, whereupon the arms are decoupled. The actuator arm then can be rotated freely back in the opposite direction so that the actuator arm socket and coin slot are aligned with another one of the transfer arm coin slots. Another coin then may be inserted, and the arms again will be coupled so that rotation of the actuator arm will rotate the transfer arm to its next predetermined position.

Thus, gumballs are dispensed by coupling the arms with a coin, rotating the actuator arm in one direction, decoupling the arms, and rotating the actuator arm in the opposite direction back to its original position. As this process is repeated, the transfer arm continues to rotate in the same direction from one predetermine position to the next.

This design has much to commend it. It is fabricated entirely from injection molded plastic pieces which can be fabricated and assembled much more economically than can designs suitable for gumball vending machines. There are, however, a number of deficiencies which it shares to a greater or lesser degree with other previously proposed and commercialized gumball bank designs.

First, the operation of the dispensing mechanism, which is functional in a general sense, is not as smooth and reliable as may be desired. The transfer arm is held in its predetermined positions by a detente post which cams in and out of slots in the transfer arm as the transfer arm is rotated. The height of the detente post is fairly critical. That is, if it is too short, the transfer arm will not be held in its predetermined positions and the various coin slots will not be aligned. If the detente post if too tall, however, it will be difficult to rotate the transfer arm.

Further, the dispensing mechanism is circular and cannot be adapted easily, if at all, to bases not having a substantially cylindrical configuration. This severely limits the aesthetic choices for the overall appearance of the bank.

Gumballs also must be loaded through a small opening in the base lower floor which can accommodate only one gumball at a time. That opening is accessible only by removing a bottom plate which secures the coin storage area. Thus, loading of gumballs is a fairly tedious operation which also requires removal and handling of coins in the coin storage area.

Finally, any improvement in the design which will result in cost savings, either in material costs or in processing and assembly costs, would be desirable.

It is an object of the subject invention, therefore, to provide gumball banks having improved dispensing mechanisms which operate more smoothly and reliably.

Another object is to provide gumball banks which may be adapted to a greater variety of aesthetic designs and, more specifically, to provide gumball banks wherein the dispensing mechanism does not constrain the base to a substantially cylindrical configuration.

A further object of the subject invention is to provide gumball banks which may be loaded with gumballs in a more rapid and convenient manner.

Yet another object is to provide gumball banks which may be more easily and economically manufactured.

It is also an object of the subject invention to provide gumball banks wherein all of the above advantages are realized.

Those and other objects and advantages of the invention will be apparent to those skilled in the art upon reading the following description and upon reference to the drawings.

SUMMARY OF THE INVENTION

The subject invention provides for gumball banks for dispensing gumballs upon insertion of a coin and for storage of inserted coins. The gumball bank comprises a reservoir for gumballs, a base, and a dispensing mechanism.

The base defines an upper floor. The upper floor supports the reservoir and has a gumball opening communicating with the reservoir. The upper floor also has a coin slot.

The base further defines a lower floor. The lower floor has a chute adapted to receive gumballs. It also has a coin slot. The base also defines a coin storage area in communication with the coin slot in the lower floor.

The dispensing mechanism is disposed between the upper and lower floors and is adapted to dispense gumballs from the reservoir to the chute and to deposit coins in the coin storage area. The dispensing mechanism includes an actuator arm having a socket for receiving a coin and a coin slot aligned with the socket. The transfer arm has a gumball opening and a coin slot.

The actuator arm and transfer arm are mounted for movement in first and second directions between respective first and second positions. The actuator arm engages the transfer arm when the actuator arm is moved in the second direction. The actuator arm and transfer arm, however, are free of any engagement when the actuator arm is moved in the first direction.

Further, when the actuator arm and the transfer arm are in their respective first positions the upper floor coin slot, actuator arm coin slot, and transfer arm coin slot are aligned to allow insertion of a coin through the upper floor coin slot into the actuator arm coin slot and the transfer arm coin slot so as to couple the arms together. The upper floor gumball opening and the transfer arm gumball opening also are aligned to allow passage of a gumball through the upper floor gumball opening into the transfer arm gumball opening.

Subsequent movement of the actuator arm in the first direction from its first position to its second position, when a coin couples the arms, actuates movement of the transfer arm in the first direction from its first position to its second position. When the actuator arm and the transfer arm are in their respective second positions, the actuator arm coin slot, transfer arm coin slot, and lower floor coin slot are aligned to allow passage of a coin through said slots into the coin storage area. The transfer arm gumball opening and the chute also are aligned.

Subsequent movement of the actuator arm in the second direction from its second position back to its first position actuates movement of the transfer arm in the second direction from its second position back to the first position.

BRIEF DESCRIPTION OF THE INVENTION

Figure 1:
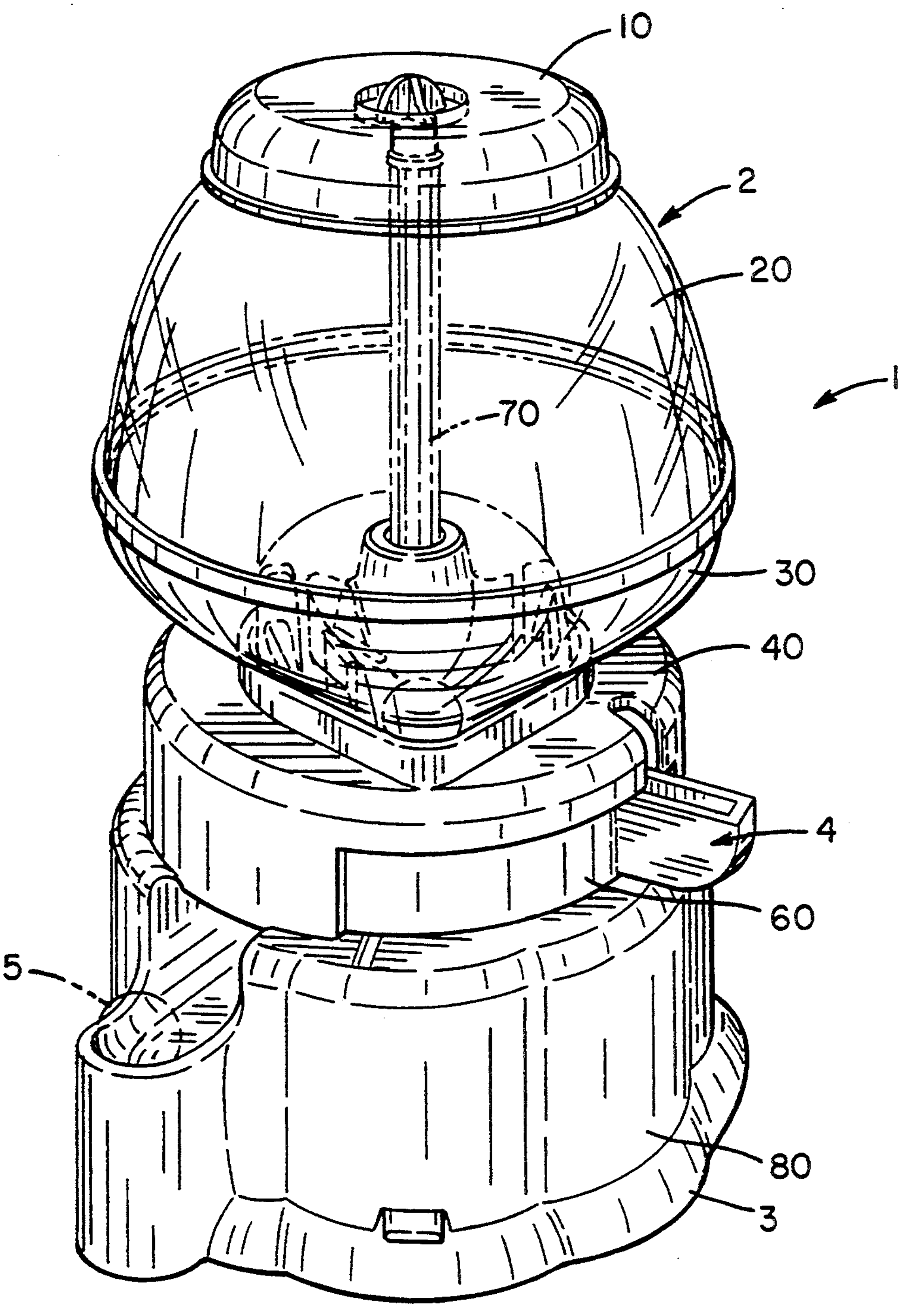
FIG. 1 is a perspective view of a preferred embodiment 1 of the gumball banks of the subject invention.
Figure 9A:
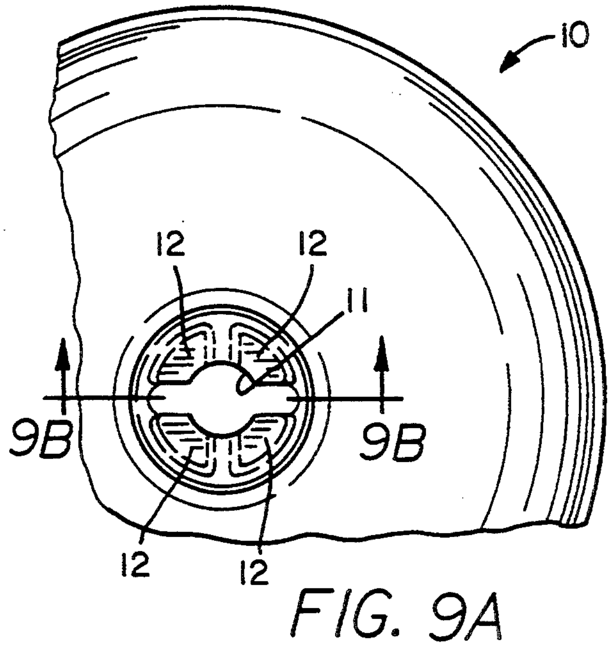
Figure 9B:
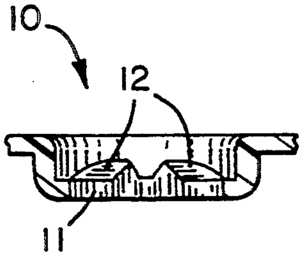

FIG. 9A is a plan view of a cover 10 incorporated in the bank 1 shown in FIG. 1; and FIG. 9B is a cross-sectional view, taken generally along line 9B—9B in FIG. 9A, of the cover 10 shown in FIG. 9A.

DETAILED DESCRIPTION OF THE INVENTION

The novel gumball banks are adapted to dispense gumballs upon insertion of a coin andl to store coins inserted in the bank. A first preferred embodiment 1 of the coin banks of the subject invention is shown in FIGS. 1–9. As can be seen in FIG. 1, the bank 1 generally comprises a reservoir 2, a base 3, and a dispensing mechanism 4 (partially visible).

The reservoir of the novel banks is adapted to store gumballs. As seen best in FIGS. 1, 2 and 8, the gumball reservoir 2 of bank 1 preferably includes a lower truncated hemisphere 30, an upper truncated hemisphere 20, and a cover 10. The top and bottom of both hemispheres 20, 30 are open, and the hemispheres 20, 30 are joined together at their diameters by engagement of detente members 21 on upper hemisphere 20 with openings 31 on lower hemisphere 30. The lower hemisphere 30 is provided with notched ribs 32 which extend upwards, but spaced slightly inwardly in the region directly inwards of openings 31, such that when upper hemisphere 20 is joined to lower hemisphere 30 the detente members 21 and adjacent portions of the top hemisphere 20 are disposed in the notched ribs 32. By providing such notched ribs 32 or their equivalent it is more difficult to dissemble detente members 21 from openings 31 since the top hemisphere 20 cannot be easily bent inwards relative to the bottom hemisphere 30 to withdraw the detente members 21.

The open top of upper hemisphere 20 is covered by cover 10 which is removably secured thereto by central post 70. More particularly, the cover 10 is provided with a slot-shaped opening 11 which corresponds substantially to the cross section of locking member 71 on central post 70. The cover 10 is secured over upper hemisphere 20 by sliding the cover 10 over and below locking member 71 and subsequently rotating the cover 10 such that detente members 12 (shown in FIGS. 9A and 9B) rotate under the locking member 71, until the locking member 71 comes to rest between the detente members 12 more or less perpendicular to the opening 11. The cover be then may be removed by rotating the cover 10 so that opening 11 and locking member 71 once again are aligned.

It will be appreciated, therefore, that the cover 10 can be removed easily, providing direct access to the reservoir when it is necessary to refill the reservoir, and that the fill opening is relatively large. Thus, refilling the reservoir with gumballs is facilitated. For those and various other reasons, the exemplary reservoir 2 is preferred. It will be appreciated, however, a large number of reservoir designs are known and can be adapted for use in the novel banks.

The base of the novel gumball banks defines an upper floor, a lower floor, and a coin storage area. The upper floor supports the reservoir and has a gumball opening communicating with the reservoir which allows gumballs to pass into the dispensing mechanism. The upper floor of the base also defines a coin slot through which a coin may be inserted into the dispensing mechanism. The base further defines a lower floor. The lower floor has a chute adapted to receive gumballs from the dispensing mechanism. The lower chute also has a coin slot. Coins inserted into the dispensing mechanism pass through that coin slot into the coin storage area.

Figure 2:
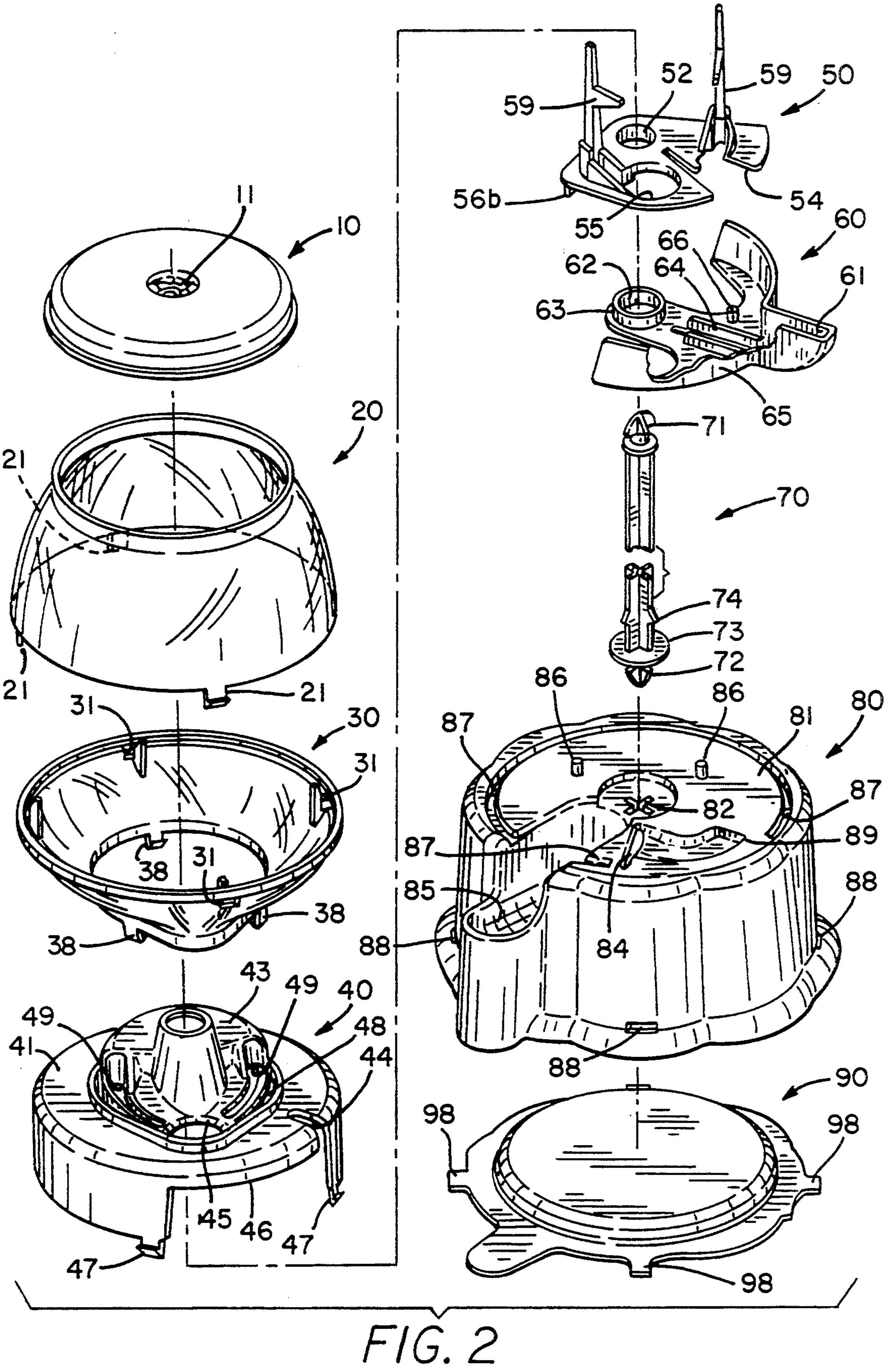
FIG. 2 is an exploded perspective view of the gumball bank 1 shown in FIG. 1, showing in particular the components from which the bank 1 is assembled.
Figure 8:
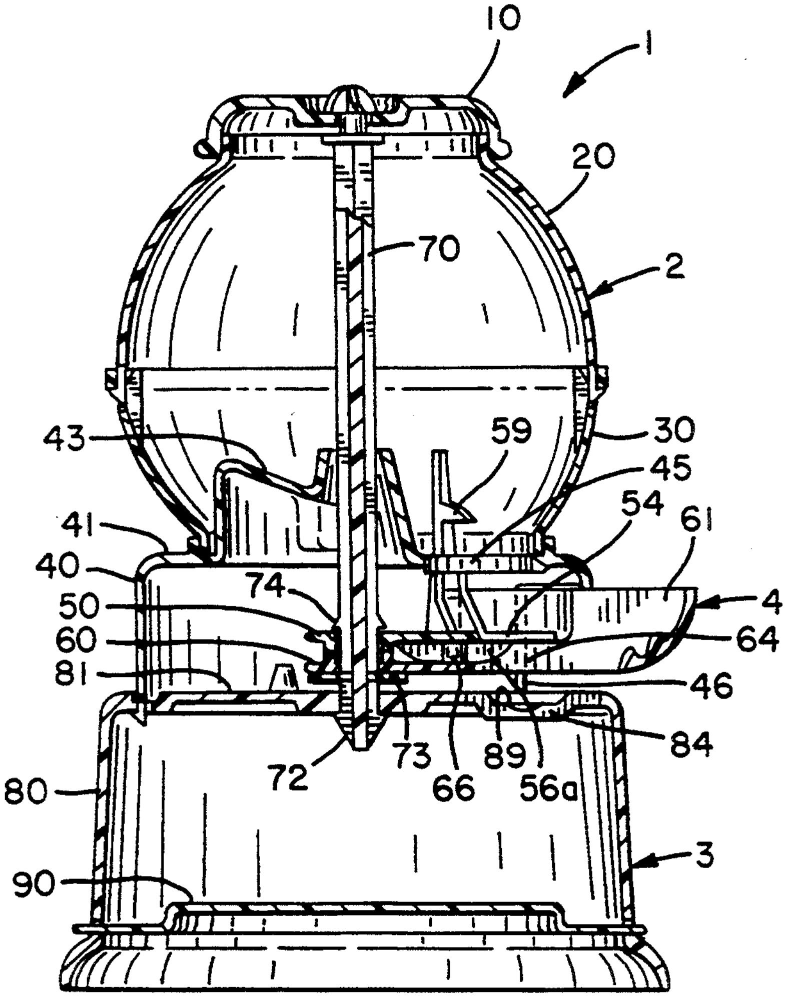
FIG. 8 is a cross-sectional view taken generally along line 8—8 in FIG. 5 of the coin bank 1 shown in FIG. 1.

In the illustrated bank 1, the base includes an upper housing 40, a lower housing 80, and a bottom plate 90, as can be seen best in FIGS. 2 and 8. The upper housing 40 defines an upper floor 41 which supports the gumball reservoir 2. More particularly, the lower hemisphere 30 is provided with detente members 38 which snap into corresponding openings 48 disposed in a generally annular groove in the upper floor 41. It will be appreciated that by disposing the openings 48 in an annular groove the junction of the components is provided with a more seamless appearance and that, analogously to the notched ribs 32 and the assembly of hemispheres 20, 30 described above, it is more difficult to disassemble the components once the detente members 38 engage the openings 48.

As will be described in greater detail below, gumballs pass from the reservoir 2 into the dispensing mechanism via a circular gumball opening 45 in the upper floor 41 provided for such purpose. The Opening 45 preferably is sized to allow only one gumball to pass therethrough at a time. Moreover, the upper floor preferably is configured to encourage movement of gumballs in the reservoir toward the gumball opening. For example, as seen best in FIG. 2, those portions 43 of upper floor 41 which are within the reservoir 2 are sloped toward gumball opening 45. The precise configuration of the floor, however, is a matter of choice, but the general slope preferably is toward the gumball opening.

Coins may be inserted into the dispensing mechanism through a slot 44 in the upper floor 41 of the base upper housing 40 whereupon, as described, they ultimately are deposited through a coin slot 84 in a lower floor 81 defined by the base lower housing 80 into a coin storage area defined by the base lower housing 80 and bottom plate 90. After a coin is deposited in the coin storage area, the dispensing mechanism deposits a gumball in a chute 85 in the lower floor 81 which allows gumballs to roll within easy access of a user.

As may be appreciated from FIG. 2, the base upper housing 40 is secured to the base lower housing 80 by snapping detente members 47 on upper housing 40 into corresponding openings 87 located in a generally annular groove in lower housing 80. As noted above, the annular groove provides a more seamless appearance and makes it more difficult to disassemble the components. Bottom plate 90 is also snapped into place in the base lower housing by inserting tongues 97 on the bottom plate 90 into corresponding openings 87 on the base lower housing 80. The base lower housing 80 and bottom plate 90 are sufficiently flexible, however, so that the bottom plate 90 may be subsequently removed and replaced so that coins may be removed from the bank 1.

Because the component pieces may be easily fabricated and assembled, the base preferably is constructed from components generally as shown. It will be appreciated, however, that functionally equivalent base assemblies may be used. For example, the base may be assembled from a main housing, which defines the upper floor, and two generally disc-shaped members which are mounted therein, one of which defines a lower floor and the other a bottom closure. Other components may be devised and used to assemble a suitable base.

The novel banks include a dispensing mechanism which is disposed between the upper and lower base floors. The dispensing mechanism includes an actuator arm and a transfer arm which cooperate to dispense gumballs from the reservoir to the chute and to deposit coins in the coin storage area. In accordance therewith, the actuator arm has a socket for receiving a coin and a coin slot which is aligned therewith. The transfer arm also has a coin slot, as well as a gumball opening.

For example, bank 1 includes transfer arm 50 and actuator arm 60. Transfer arm 50 is provided with a coin slot 54 and a gumball opening 55. Actuator arm 60 has a coin socket 61 and a coin slot 64. The essential features of the arms 50, 60, however, are best understood by a description of their operation and by comparing FIGS. 2–8.

That is, the actuator arm and transfer arm in the novel banks are mounted for movement in first and second directions between respective first and second positions. The actuator arm and transfer arm are free of engagement when the actuator arm is moved in the first direction unless, as described further below, the arms are coupled together by a coin. The actuator arm, however, engages the transfer arm when the actuator arm is moved in the second direction regardless of whether a coin is present.

For example, in bank 1 transfer arm 50 and actuator arm 60 are mounted for clockwise and counter-clockwise rotation on the central post 70 which extends through, respectively, openings 52 and 62 in their respective central portions. The arms 50, 60 are mounted in the base 3 between the upper floor 41 and lower floor 81. The socket 61 of the actuator arm extends through and is rotated across a cut-out 46 in the base upper housing 40 so that a coin may be inserted therein and so that it may be grasped for actuation by a user. The actuator arm 60 is provided with an upstanding skirt 65 which substantially prevents access to the interior of the base 3 through cut-out 46 as the actuator arm 60 is rotated.

The central post 70 itself is mounted to the lower base housing 80 by snapping detente member 72 through a cross-shaped opening 82 in the central portion of lower floor 81, further movement of central post 70 through the opening 82 being restricted by an annular shoulder 73. The transfer arm 50 and actuator arm 60 are snapped over detente member 74 on central post 70, and their vertical movement thereafter is restricted between annular shoulder 73 and detente member 74. Thus, the transfer arm 50 and actuator arm 60 are mounted in a spaced apart, generally parallel, overlapping relationship, the spacing being provided by annular shoulders 53 and 63 extending, respectively, downward around central opening 52 of the transfer arm 50 and upwardly around central opening 62 of the actuator arm 60.

Figure 3:
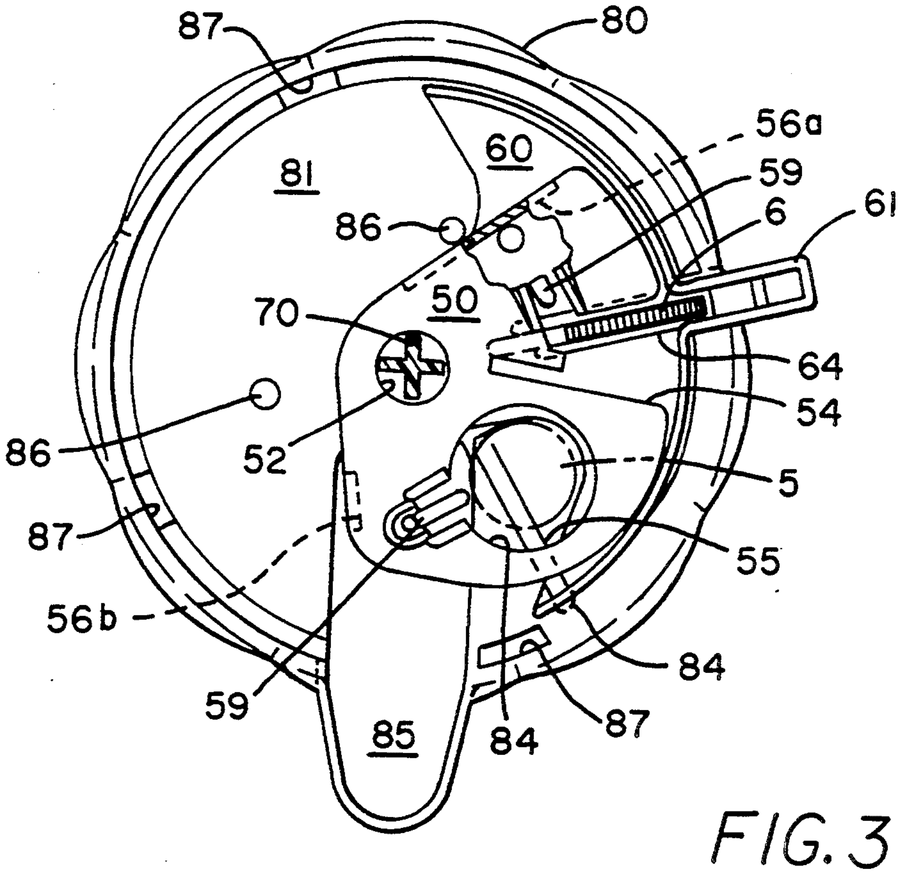
FIGS. 3–6 are plan views of the gumball bank 1 shown in FIG. 2 with the upper components removed to show details of the dispensing mechanism in various positions.

The transfer arm 50 and actuator arm 60, when located in their extreme counter-clockwise positions shown in FIGS. 1, 3, and 8, are in position to receive a coin and to begin dispensing a gumball. As discussed below, when a coin is inserted into the dispensing mechanism it couples the transfer arm 50 and actuator arm 60 together so that movement of the actuator arm in a clockwise direction will ultimately cause movement of both the actuator arm 60 and the transfer arm 50 from their extreme counter-clockwise positions to their extreme clockwise positions shown in FIG. 5. In the absence of such coupling, however, clockwise rotation of the actuator arm 60 does not cause the transfer arm 50 to rotate to any significant degree, the only contact between the arms 50 and 60 being frictional contact between shoulders 53 and 63. Thus, as will become apparent from the discussion which follows, gumballs will not be dispensed unless a coin is inserted into the bank.

Figure 5:
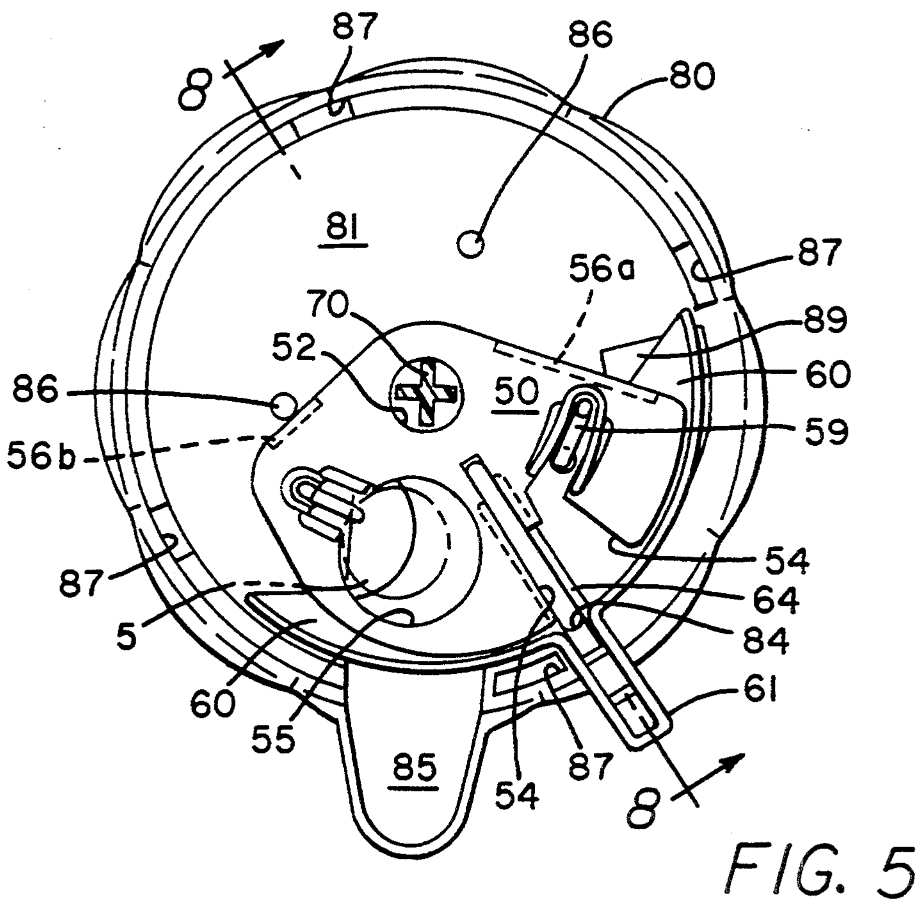
Figure 6:
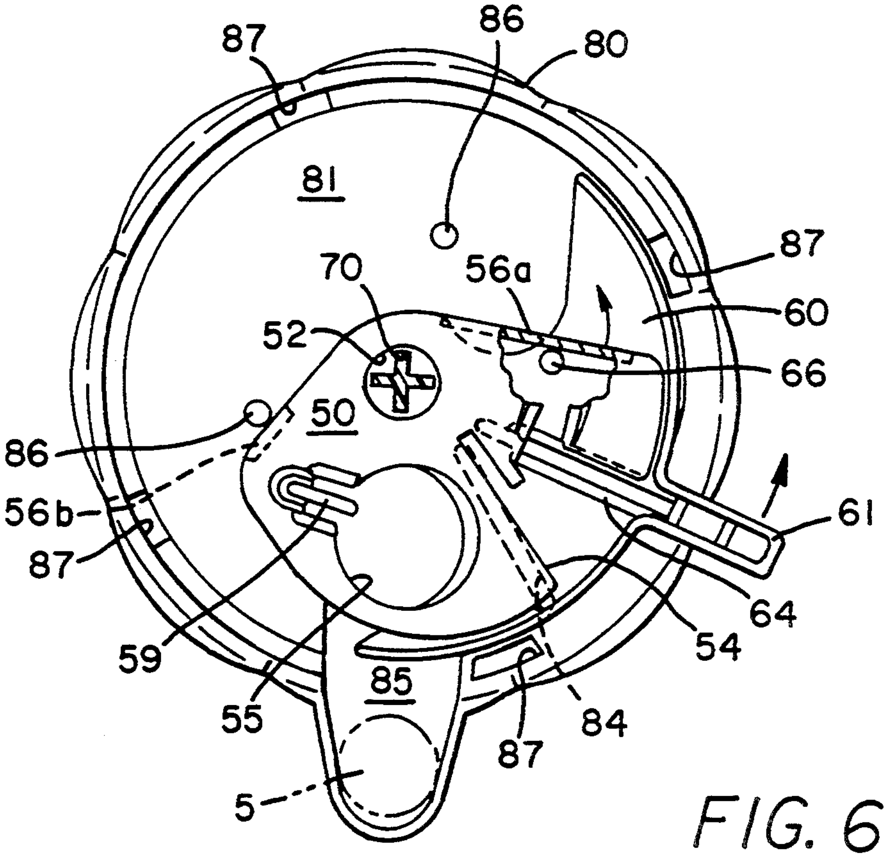
Figure 7:
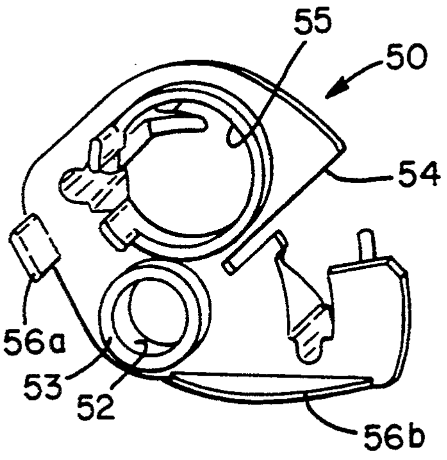
FIG. 7 is a bottom perspective view of a transfer arm 50 incorporated in the bank 1 shown in FIG. 1.

When the actuator arm 60 is rotated in a counter-clockwise direction, however, an upstanding post 66 on the actuator arm 60 engages a downwardly depending rib 56 on the transfer arm 50, as seen best in FIG. 6. Thus, to the extent that the transfer arm 50 is not already in its extreme counter-clockwise, ready position, counter-clockwise rotation of the actuator arm 60 will cause the transfer arm 50 to rotate in a counter-clockwise direction until both arms 50 and 60 reach their extreme counter-clockwise, ready positions. As may be appreciated by comparing FIGS. 2, 3, 5, and 7, rotation of the actuator arm 60 between its extreme clockwise and counter-clockwise positions is limited by engagement of the socket 61 with the vertical edges of the cut-out 46 in the base upper housing 40. Similarly, rotation of the transfer arm 50 between its extreme clockwise and counter-clockwise positions is limited by engagement of the rib 56*a* and another downwardly projecting rib 56*b* with bosses 86 projecting upwardly from the lower floor 81 of the base lower housing 80.

When the actuator arm and the transfer arm are in their respective first positions, the upper floor gumball opening and the transfer arm gumball opening are aligned to allow passage of a gumball through the upper floor gumball opening into the transfer arm gumball opening. For example, when transfer arm 50 and actuator arm 60 are in their respective counter-clockwise, ready positions shown in FIG. 3, the opening 55 in transfer arm 50 is aligned with the opening 45 in the upper floor 41 of the base upper housing 40 (not shown therein). Accordingly, a gumball 5 (shown in phantom in FIGS. 3–6) is allowed to pass from the reservoir 2 through the opening 45 and into the gumball opening 55 in the transfer arm 50. At this point, the gumball opening 55 is situated above the lower floor 81 of the base lower housing 80 and the elevation of the transfer arm 60 above the lower floor 8 is such that the gumball 5 does not pass through the opening 55, but instead comes to rest on the lower floor 81 within the opening 55.

Further, when the actuator arm and the transfer arm are in their respective first positions, the upper floor coin slot, actuator arm coin slot, and transfer arm coin slot also are aligned. This alignment allows insertion of a coin through the upper floor coin slot into the actuator arm coin slot and the transfer arm coin slot so as to couple the arms together.

For example, when actuator arm 60 and transfer arm 50 are in their respective ready positions, the coin slots 44, 54, and 64 are in alignment. That is, a coin 6 may be inserted into the socket 61 on actuator arm 60 whereupon it is able to roll through the coin slot 44 in the upper floor 41 of the base upper housing 40. After the coin 6 rolls down the socket 61 and passes through the coin slot 44 into the interior of the base 3, it comes to rest on a curved groove 89 in the lower floor 81 of the base lower housing 8O, standing on edge in an upright position within coin slot 64 in actuator arm 60 and coin slot 54 in transfer arm 50. Ribs extending upward along the sides of slot 54 aid in maintaining the coin on its edge. In this manner, as described further below, the coin serves to couple the actuator arm 60 and transfer arm 50 together.

That is, in accordance with the subject invention, subsequent movement of the actuator arm in the first direction from its first position to its second position, when the coin so couples the actuator arm and transfer arm, actuates movement of the transfer arm in the first direction from its first position to its second position. For example, when the actuator arm 60 is moved in a clockwise direction from its ready position toward its extreme clockwise position, it will actuate movement of the transfer arm 50 in a clockwise direction from its ready position to its extreme clockwise position. As noted previously, in the absence of such coupling by coin 6, the actuator arm 60 and the transfer arm 50 do not engage each other when the actuator arm 60 is moved in the clockwise direction.

In accordance with a preferred aspect of the subject invention, the coin slot in the transfer arm has two areas. The first area is relatively wide, that is, somewhat wider than a coin, preferably having a width approximately equal to the diameter of the gumballs to be dispensed from the bank. The second area is relatively narrow, preferably only slightly wider than the width of the thickest coin to be inserted in the bank. By providing the coin slot with a relatively wide area, the movement of the actuator arm is increased relative to the transfer arm. Movement of the actuator arm and transfer arm proceeds in a "staged" manner. By providing both narrow and wide areas, the coin is able to loosely couple the arms initially and to more tightly couple the arms as the actuator arms is moved toward its second position. As will become apparent from the discussion which follows, therefore, gumballs are dispensed only after a coin has been deposited in the coin storage area.

The precise width of the two areas in the transfer arm coin clot is subject to variation in order to achieve the desired degree of "staged" movement and coupling of the dispensing mechanism. For example, the transfer arm coin slot 54 is approximately e,fra 1/2" across, that being the approximate diameter of the gumballs which the bank 1 is designed to dispense. The slot 54 has a narrow area slightly wider than the thickness of a nickel, a nickel being the thickest coin which the bank 1 is designed to accommodate, which is aligned with the clockwise side of the wide area in slot 54.

Figure 4:
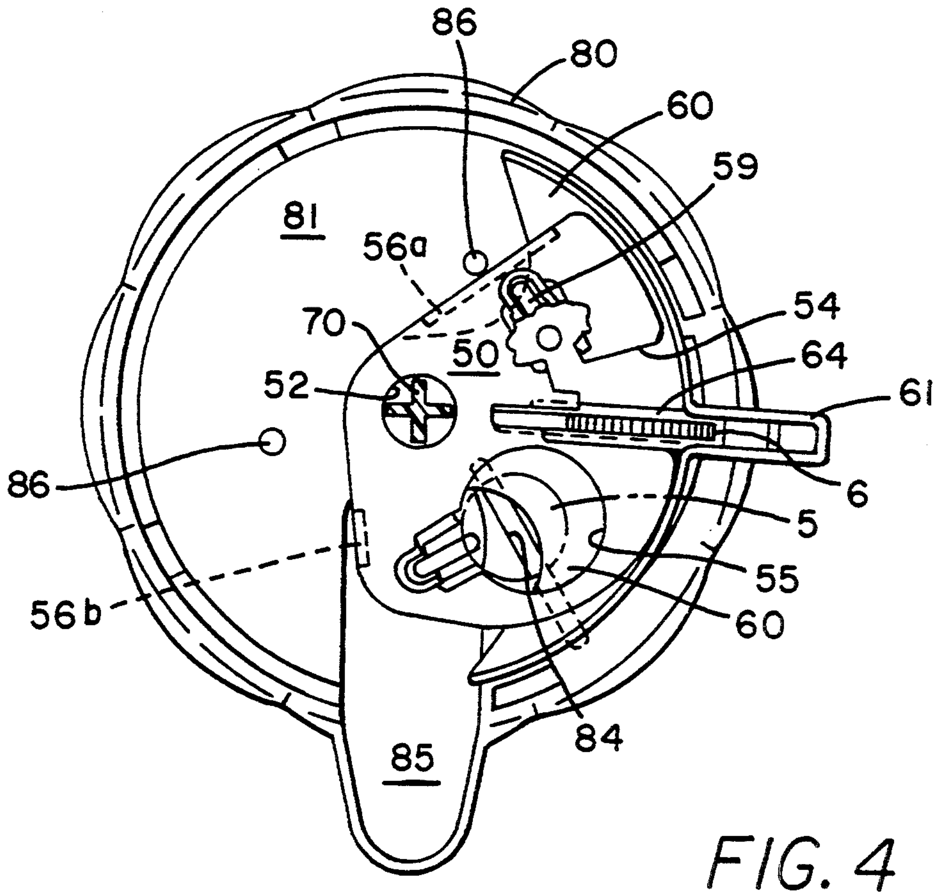

When the actuator arm 60 and transfer arm 50 are in their respective ready positions the inserted coin 6 is to the counter-clockwise side of the wide area in slot 54, as shown in FIG. 3. Thus, as the actuator arm 60 is initially rotated in the clockwise direction, the coin 6 is pushed on its edge over the surface of groove 89 by coin slot 64 until it reaches the other side of the transfer arm coin slot 54 as shown in FIG. 4. At this point, the transfer arm 50 has remained in its extreme counter-clockwise position, and the actuator arm 60 has slipped wholly or partially under the gumball 5 to a point where the gumball is supported within the gumball opening 55 by actuator arm 60. Further rotation of the actuator arm 60 in the clockwise direction will cause the inserted coin 6 to engage the clockwise side of the wide area of slot 54 and cause rotation of the transfer arm 50 in a clockwise direction.

Through this initial range of motion away from and towards their respective first positions, the transfer arm 50 and actuator arm 60 are loosely coupled. That is, rotation of the actuator arm 60 will actuate rotation of the transfer arm 50, but in a staged manner, actuation of the transfer arm 50 lagging somewhat behind when the direction of rotation of the actuator arm 60 is reversed. It will be appreciated, however, that the groove 89 in lower base housing 80 is curved, so as to provide a camming surface relative to the motion of the coin 6 through groove 89 and to direct coin 6 into and out of the narrow area in slot 54. That is, as the rotation of actuator arm 60 in the clockwise direction continues, groove 89 will cam coin 6 into the narrow area in slot 54 so that the transfer arm 50 and actuator arm 60 are relatively tightly coupled as they rotate the rest of the way toward their respective second positions. As will be discussed further below, this relatively tight coupling of the arms 50, 60 in this second range of motion towards and away from their second positions ensures that gumballs will be dispensed only when a coin is deposited in the coin storage area.

When the actuator arm and the transfer arm reach their respective second positions, the actuator arm coin slot, transfer arm coin slot, and lower floor coin slot are aligned to allow passage of the coin into the coin storage area. For example, once the actuating arm 60 and transfer arm 50 have reached their extreme clockwise positions, shown in FIG. 5, coin slots 64 and 54 are aligned with coin slot 84 in the base lower housing 80. At this point, the coin 6 drops through the coin slot 84 into the coin storage area. Once the coin drops into the coin storage area, the arms 50 and 60 are uncoupled.

When the arms are in their second positions, the transfer arm gumball opening and the chute also are aligned to allow a gumball to drop into the chute. In accordance with a preferred aspect of the invention, however, a portion of the actuator arm is disposed under the transfer arm gumball opening to prevent a gumball from immediately dropping into the chute. Subsequent movement of the actuator arm in the second direction from its second position back to its first position, however, will move the actuator arm out from under the transfer arm gumball opening and will allow passage of a gumball into the chute.

For example, when the actuator arm 60 and transfer arm 50 are in their respective clockwise positions, as shown in FIG. 5, gumball opening 55 is directly over chute 85 in a position to dispense the gumball 5 into the chute 85. By virtue of the relatively wide coin slot 54 in the transfer arm 50, however, the actuator arm 60 has rotated farther than the transfer arm 50 so that the chute 85 is partially covered by a portion of actuator arm 60. Thus, gumball 5 in the opening 55 is not immediately dispensed and movement of the arms 50, 60 in the counter-clockwise direction is also staged. That is, as the actuator arm 60 is moved in a counter-clockwise direction, there initially is no engagement between the actuator arm 60 and transfer arm 50. Transfer arm 50 remains stationary while actuator arm 60 gradually uncovers chute 85. By the time the actuator arm 60 has traveled a distance equal to the width of coin slot 54, as shown in FIG. 6, the chute 85 is totally uncovered and gumball 5 in opening 55 will be dispensed into the chute 85. At this point, the actuator arm 60 engages the transfer arm 50, as described above, and continued rotation of the actuator arm 60 in a counter-clockwise direction causes both the actuator arm 60 and the transfer arm 50 to return to their ready positions.

On the other hand, it will be appreciated that gumball 5 will not be dispensed until transfer arm 50 and actuator arm 60 have been placed in their respective second positions and coin 6 has been dropped into the coin storage area. Until coin 6 has been dropped transfer arm 50 and actuator arm 60 are tightly coupled when the arms 50, 60 are in the vicinity of their second positions, the coin 6 having been cammed into the narrow area in slot 54 by groove 89. Thus, actuator arm 60 will be disposed under gumball opening 55 in transfer arm 50 whenever the opening 55 is situated over the chute 85 until coin 6 is dropped. Moreover, because a user may decide not to dispense a gumball after a coin is inserted, the groove 89 also provides a camming surface to cam the coin 6 back out of the narrow area in slot 54 after the opening 55 is no longer over the chute 85 so that the coin 6 can be retrieved from socket In accordance with another preferred aspect of the invention, the transfer arm 50 is provided with upstanding fingers 59 which project through arcuate openings 49 in the base upper housing 40 and into the reservoir 2. The fingers 59, as the transfer arm 50 rotates back and forth between its extreme positions, aid in feeding gumballs toward the gumball opening 45. Of course, other suitable fingers may be provided for such purposes.

It will be appreciated, therefore, that the novel banks have a simple dispensing mechanism which reliably and smoothly dispenses gumballs only when a coin is inserted into the bank. The one-way engagement between the actuator arm and transfer arm described above assures that the transfer arm is in its ready position whenever the actuator arm is moved to its ready position. There is no need for detente means to position the transfer arm as has been done in prior art designs. Thus, the overall design of the dispensing mechanism is simplified and the problems inherent with designing and building such detente means are avoided. Moreover, operation of the dispensing mechanism is smoother since there is no resistance which must be overcome to rotate the arms.

Moreover, the novel banks are easily and economically manufactured. All of the components may be, and preferably are, manufactured by conventional injection molding processes from thermoplastic polymers. For example, the reservoir hemispheres preferably are fabricated from transparent plastic such as high grade styrene; the central post, transfer arm, and actuator arm preferably are fabricated from fairly rigid plastic which is more suited to precision molding such as polystyrene; and the cover, base portion, and bottom plate may be fabricated from relatively inexpensive, flexible polymers such as high density polyethylene. A variety of thermoplastic polymers are available, however, and may be used as desired.

It also will be appreciated that the individual components are easily assembled. The illustrated bank 1, for example, can be snapped together entirely by hand without the need for any special equipment or materials. On the other hand, if called for in a particular application, the components may be joined by any suitable method, such as adhesives, welding, screws, other snap-in interference fittings, and the like.

The material cost for the novel banks also may be minimized as compared to prior art designs. As a specific example, it will be appreciated that prior art transfer arms which are designed to rotate in a single direction and have multiple gumball openings are relatively large. In contrast, the transfer arm in the novel gumball banks moves back and forth and needs only one gumball opening. Thus, the transfer arm in the novel banks can be made smaller, and material costs can be reduced.

Also, in many prior art designs the reservoir is joined to the base by sonic welding. That process limits the choice of resins for the base to relatively expensive resins such as polystyrene which can be welded to a transparent polystyrene reservoir. By snapping the base and reservoir together as illustrated in the bank 1, however, less expensive resins such as high density polyethylene may be used in the base since weld compatibility is not an issue.

Finally, the dispensing mechanism of the novel banks allows greater freedom in designing the overall appearance of the novel banks. That is, the dispensing mechanism of prior art designs, at least those having transfer arms which are limited to rotation in a single direction, are almost invariably circular. Thus, the overall configuration of the base is limited, as a practical matter, to a generally cylindrical shape, and it is often impractical or impossible to modify the dispensing mechanism to accommodate other shapes.

A cylindrical shape is popular and has a traditional appeal, and the novel banks disclosed herein can be fabricated in that general style. Because the transfer arm is designed to move back and forth as it dispenses gumballs, however, such movement is not limited to rotation about an axis, and can include translational motion as well. For example, the transfer arm and actuator arm can be fabricated in a generally rectangular configuration, whereupon they can be mounted in a variety of ways so that they slide back and forth between their respective first and second positions. Because the dispensing mechanism has a generally rectangular shape and relies on linear translation, the base may be designed to have a generally solid-rectangular shape or any other shape having a sufficiently large flat profile.

While this invention has been disclosed primarily in terms of specific embodiments thereof, it is not intended to be limited thereto. Other modifications and embodiments will be apparent to the worker in the art.

We claim as our invention:

1. A gumball bank for dispensing gumballs upon insertion of a coin and for storage of inserted coins, the gumball bank comprising:

a reservoir for gumballs;

a base defining an upper floor, the upper floor supporting the reservoir and having a gumball opening communicating with the reservoir and a coin slot;

the base further defining a lower floor, the lower floor having a chute adapted to receive gumballs, a coin slot, and a camming surface;

the base further defining a coin storage area in communication with the coin slot in the lower floor;

a dispensing mechanism disposed between the upper and lower floors and adapted to dispense gumballs from the reservoir to the chute and to deposit coins in the coin storage area;

the dispensing mechanism including an actuator arm having a socket for receiving a coin and a coin slot in alignment therewith and a transfer arm having a gumball opening and a coin slot with a relatively wide area and a relatively narrow area;

the actuator arm and transfer arm being mounted for movement in first and second directions between respective first and second positions, the actuator arm engaging the transfer arm when the actuator arm is moved in the second direction, the actuator arm and transfer arm being free of engagement when the actuator arm is moved in the first direction; such that when the actuator arm and the transfer arm are in their respective first positions the upper floor coin slot, actuator arm coin slot, and transfer arm coin slot are aligned to allow insertion of a coin through the upper floor coin slot into the actuator arm coin slot and the transfer arm coin slot so as to couple the arms together and the upper floor gumball opening and the transfer arm gumball opening are aligned to allow passage of a gumball through the upper floor gumball opening into the transfer arm gumball opening;

subsequent movement of the actuator arm in the first direction from its first position to its second position, when a coin couples the arms, actuates movement of the transfer arm in the first direction from its first position to its second position and camming of the coin into the narrow area in the transfer arm coin clot by the lower floor camming surface;

when the actuator arm and the transfer arm are in their respective second positions, the actuator arm coin slot, transfer arm coin slot, and lower floor coin slot are aligned to allow passage of a coin through said slots into the coin storage area and the transfer arm gumball opening and the chute are aligned; and subsequent movement of the actuator arm in the second direction from its second position back to its first position actuates movement of the transfer arm in the second direction from its second position back to its first position.

2. The coin bank of claim 1, wherein the actuator arm and the transfer arm are rotatably mounted in the base for rotation between their respective first and second positions.

3. The coin bank of claim 1, wherein the bank comprises a central post extending through central openings in the actuator arm and transfer arm,the actuator arm and transfer arm being rotatable about the central post.

4. The coin bank of claim 1, wherein the actuator arm and transfer arm are slidably mounted in the base for translation between their respective first and second positions.

5. The coin bank of claim 1, wherein the wide area in the transfer arm coin slot has a width approximately equal to the diameter of the gumballs to be dispensed from the bank.

6. The coin bank of claim 1, wherein a portion of the actuator arm, when the actuator arm and the transfer arm are in their respective second positions, is disposed under the transfer arm gumball opening to prevent passage of a gumball from the transfer arm gumball opening to the chute, subsequent movement of the actuator arm in the second direction from its second position back to its first position withdrawing the actuator arm and allowing passage of a gumball from the transfer arm gumball opening into the chute.

7. The coin bank of claim 1, wherein the base comprises an upper housing, a lower housing, and a bottom plate, the upper housing having an upper surface defining the base upper floor and an open bottom, the lower housing having an upper surface defining the base lower floor and an open bottom receiving the bottom plate.

8. The coin bank of claim 7, wherein the base lower housing has a plurality of openings adapted to engage corresponding detente members on the base upper housing.

9. The coin bank of claim 8, wherein the openings in the base lower housing engaging the detente members in the base upper housing are disposed in a groove.

10. The coin bank of claim 7, wherein the base lower housing has a plurality of openings adapted to receive corresponding tongues on the base bottom plate.

11. The coin bank of claim 7, wherein the bank comprises a central post extending through central openings in the base lower housing, actuator arm, transfer arm, and base upper housing, the central post including detente members to engage the central opening of the base lower housing, actuator arm, and transfer arm.

12. The coin bank of claim 1, wherein the reservoir includes a lower truncated hemisphere, an upper truncated hemisphere, and a cover, the lower hemisphere having a plurality of detente members adapted to engage corresponding openings in the base upper floor, one of the hemispheres having detente members adapted to engage corresponding openings in the other hemisphere, and the cover being adapted to cover the top of the upper hemisphere and to provide access for loading gumballs into the reservoir.

13. The coin bank of claim 12, wherein the openings in the base upper housing engaging the detente members on the reservoir lower hemisphere are disposed in a groove.

14. The coin bank of claim 7, wherein the reservoir includes a lower truncated hemisphere, an upper truncated hemisphere, and a cover, the lower hemisphere having a plurality of detente members adapted to engage corresponding openings in the base upper floor, one of the hemispheres having detente members adapted to engage corresponding openings in the other hemisphere, and the cover being adapted to cover the top of the upper hemisphere and to provide access for loading gumballs into the reservoir.

15. The coin bank of claim 14, wherein the bank comprises a central post extending through central openings in the base lower housing, actuator arm, transfer arm, base upper housing, and reservoir cover, the central post including the top members to engage the central openings of the base lower housing, actuator arm, and transfer arm and including locking members to engage the central opening in the reservoir cover.

16. The coin bank of claim 1, wherein the transfer arm includes one or more upstanding feed arms projecting through slots in the base upper floor into the gumball reservoir.

17. A gumball bank for dispensing gumballs upon insertion of a coin and for storage of inserted coins, the gumball bank comprising:

a reservoir for gumballs;

a base defining an upper floor, the upper floor supporting the reservoir and having a gumball opening communicating with the reservoir and a coin slot;

the base further defining a lower floor, the lower floor having a chute adapted to receive gumballs, a coin slot, and a camming surface;

the base further defining a coin storage area in communication with the coin slot in the lower floor;

a dispensing mechanism disposed between the upper and lower floors and adapted to dispense gumballs from the reservoir to the chute and to deposit coins in the coin storage area;

the dispensing mechanism including an actuator arm having a socket for receiving a coin and a coin slot in alignment therewith and a transfer arm having a gumball opening and a coin slot with a relatively wide area and a relatively narrow area;

the actuator arm and transfer arm being rotatably mounted for rotation over the lower floor camming surface in first and second directions between respective first and second positions, the actuator arm engaging the transfer arm when the actuator arm is rotated in the second direction, the actuator arm and transfer arm being free of engagement when the actuator arm is rotated in the first direction; such that when the actuator arm and the transfer arm are in their respective first positions the upper floor coin slot, actuator arm coin slot, and transfer arm coin slot are aligned to allow insertion of a coin through the upper floor coin slot into the actuator arm coin slot and the transfer arm coin slot so as to couple the arms together and the upper floor gumball opening and the transfer arm gumball opening are aligned to allow passage of a gumball through the upper floor gumball opening into the transfer arm gumball opening;

subsequent rotation of the actuator arm in the first direction from its first position to its second position, when a coin couples the arms and after the actuator arm has been rotated a distance equal to the width of the wide area in the transfer arm coin slot, actuates movement of the transfer arm in the first direction from its first position to its second position and camming of a coin into the narrow area in the transfer arm coin slot by the lower floor camming surface;

when the actuator arm and the transfer arm are in their respective second positions, the actuator arm coin slot, transfer arm coin slot, and lower floor coin slot are aligned to allow passage of a coin through said slots into the coin storage area, the transfer arm gumball opening and the chute are aligned, and a portion of the actuator arm is disposed under the transfer arm gumball opening to prevent passage of a gumball from the transfer arm gumball opening to the chute; and subsequent rotation of the actuator arm in the second direction from its second position back to its first position withdraws the actuator arm and allows passage of a gumball from the transfer arm gumball opening into the chute and, after the actuator arm has rotated a distance equal to the width of the transfer arm coin slot, actuates rotation of the transfer arm in the second direction from its second position back to its first position.

18. A gumball bank for dispensing gumballs upon insertion of a coin and for storage of inserted coins, the gumball bank comprising:

a reservoir for gumballs;

a base defining an upper floor, the upper floor supporting the reservoir and having a gumball opening communicating with the reservoir and a coin slot;

the base further defining a lower floor, the lower floor having a chute adapted to receive gumballs and a coin slot;

the base further defining a coin storage area in communication with the coin slot in the lower floor;

a dispensing mechanism disposed between the upper and lower floors and adapted to dispense gumballs from the reservoir to the chute and to deposit coins in the coin storage area;

the dispensing mechanism including an actuator arm having a socket for receiving a coin and a coin slot in alignment therewith and a transfer arm having a gumball opening and a coin slot;

the actuator arm and transfer arm being mounted for sliding translation in first and second directions between respective first and second positions, the actuator arm engaging the transfer arm when the actuator arm is moved in the second direction, the actuator arm and transfer arm being free of engagement when the actuator arm is moved in the first direction; such that when the actuator arm and the transfer arm are in their respective first positions the upper floor coin slot, actuator arm coin slot, and transfer arm coin slot are aligned to allow insertion of a coin through the upper floor coin slot into the actuator arm coin slot and the transfer arm coin slot so as to couple the arms together and the upper floor gumball opening and the transfer arm gumball opening are aligned to allow passage of a gumball through the upper floor gumball opening into the transfer arm gumball opening;

subsequent movement of the actuator arm in the first direction from its first position to its second position, when a coin couples the arms, actuates movement of the transfer arm in the first direction from its first position to its second position;

when the actuator arm and the transfer arm are in their respective second positions, the actuator arm coin slot, transfer arm coin slot, and lower floor coin slot are aligned to allow passage of a coin through said slots into the coin storage area and the transfer arm gumball opening and the chute are aligned; and subsequent movement of the actuator arm in the second direction from its second position back to its first position actuates movement of the transfer arm in the second direction from its second position back to its first position.

19. A gumball bank for dispensing gumballs upon insertion of a coin and for storage of inserted coins, the gumball bank comprising:

a reservoir for gumballs;

a base defining an upper floor, the upper floor supporting the reservoir and having a gumball opening communicating with the reservoir and a coin slot;

the base further defining a lower floor, the lower floor having a chute adapted to receive gumballs and a coin slot;

the base further defining a coin storage area in communication with the coin slot in the lower floor;

a dispensing mechanism disposed between the upper and lower floors and adapted to dispense gumballs from the reservoir to the chute and to deposit coins in the coin storage area;

the dispensing mechanism including an actuator arm having a socket for receiving a coin and a coin slot in alignment therewith and a transfer arm having a gumball opening and a coin slot;

the actuator arm and transfer arm being mounted for movement in first and second directions between respective first and second positions, the actuator arm engaging the transfer arm when the actuator arm is moved in the second direction, the actuator arm and transfer arm being free of engagement when the actuator arm is moved in the first direction; such that when the actuator arm and the transfer arm are in their respective first positions the upper floor coin slot, actuator arm coin slot, and transfer arm coin slot are aligned to allow insertion of a coin through the upper floor coin slot into the actuator arm coin slot and the transfer arm coin slot so as to couple the arms together and the upper floor gumball opening and the transfer arm gumball opening are aligned to allow passage of a gumball through the upper floor gumball opening into the transfer arm gumball opening;

subsequent movement of the actuator arm in the first direction from its first position to its second position, when a coin couples the arms, actuates movement of the transfer arm in the first direction from its first position to its second position;

when the actuator arm and the transfer arm are in their respective second positions, the actuator arm coin slot, transfer arm coin slot, and lower floor coin slot are aligned to allow passage of a coin through said slots into the coin storage area, the transfer arm gumball opening and the chute are aligned, and a portion of the actuator arm is disposed under the transfer arm gumball opening to prevent passage of a gumball from the transfer arm gumball opening to the chute; and subsequent movement of the actuator arm in the second direction from its second position back to its first position allows passage of a gumball from the transfer arm gumball opening into the chute and actuates movement of the transfer arm in the second direction from its second position back to its first position.

* * * * *